United States Patent
Chen et al.

(10) Patent No.: US 11,298,784 B2
(45) Date of Patent: Apr. 12, 2022

(54) SCREW SUPPLYING MODULE AND ROBOT MANIPULATOR EMPLOYING SAME

(71) Applicant: Delta Electronics, Inc., Taoyuan (TW)

(72) Inventors: Tse-Min Chen, Taoyuan (TW); Chi-Jung Huang, Taoyuan (TW)

(73) Assignee: DELTA ELECTRONICS, INC., Taoyuan (TW)

(*) Notice: Subject to any disclaimer, the term of this patent is extended or adjusted under 35 U.S.C. 154(b) by 28 days.

(21) Appl. No.: 17/024,374

(22) Filed: Sep. 17, 2020

(65) Prior Publication Data
US 2021/0107098 A1    Apr. 15, 2021

(30) Foreign Application Priority Data
Oct. 15, 2019 (CN) .......................... 201921722299.6

(51) Int. Cl.
| | | |
|---|---|---|
| *B23P 19/00* | (2006.01) | |
| *B23P 19/06* | (2006.01) | |
| *B25J 9/00* | (2006.01) | |
| *B25J 11/00* | (2006.01) | |
| *B25B 23/10* | (2006.01) | |

(52) U.S. Cl.
CPC ............. *B23P 19/006* (2013.01); *B23P 19/06* (2013.01); *B25J 9/0009* (2013.01); *B25J 11/005* (2013.01); *B25B 23/10* (2013.01)

(58) Field of Classification Search
CPC ......... B23P 19/006; B23P 19/06; B21J 15/32; B25B 23/10; B25J 9/0009; B25J 11/005; B25J 11/007
See application file for complete search history.

(56) References Cited

U.S. PATENT DOCUMENTS

| | | | | |
|---|---|---|---|---|
| 2,845,968 | A | * 8/1958 | Luber | .................... B25B 23/10 |
| | | | | 81/57.42 |
| 4,775,090 | A | * 10/1988 | Kuo | ....................... B25C 1/047 |
| | | | | 227/149 |
| 8,127,643 | B1 | 3/2012 | Tan | |

(Continued)

FOREIGN PATENT DOCUMENTS

| | | |
|---|---|---|
| CN | 201596894 U | 10/2010 |
| CN | 201922390 U | 8/2011 |

(Continued)

*Primary Examiner* — Matthew P Travers
(74) *Attorney, Agent, or Firm* — Kirton McConkie; Evan R. Witt (57) ABSTRACT

A screw supplying module includes a main body, a feeding body and a holding module. The main body includes a second portion, a third portion and a hollow part. The holding module includes a screw chamber, a plurality of clamping pieces, an elastic piece and a fixing piece. The screw chamber includes an input portion, an outer ring wall and an inner space. The plurality of clamping pieces are inserted into the plurality of holes respectively. Accordingly, the plurality of clamping pieces are partially located in the inner space and are partially exposed from the holes of the screw chamber. The elastic piece is sleeved on the outer ring wall, and the elastic piece abuts against the part of the plurality of clamping pieces exposed from the holes. The fixing piece is sleeved on the outer ring wall and is configured to fix the elastic piece.

16 Claims, 7 Drawing Sheets

(56) References Cited

U.S. PATENT DOCUMENTS

2011/0146455 A1* 6/2011 Simon ..................... B25C 1/188
                                                          81/44
2018/0021900 A1* 1/2018 Huang ................... B25J 9/1679
                                                          700/114

FOREIGN PATENT DOCUMENTS

KR       100604345 B1 *  7/2006  ............. B23P 19/06
TW          I471199 B     2/2015

* cited by examiner

SCREW SUPPLYING MODULE AND ROBOT MANIPULATOR EMPLOYING SAME

CROSS-REFERENCE TO RELATED APPLICATION

This application claims priority to China Patent Application No. 201921722299.6, filed on Oct. 15, 2019. The entire contents of the above-mentioned patent application are incorporated therein by reference for all purposes.

FIELD OF THE INVENTION

The present disclosure relates to a screw supplying module, and more particularly to a screw supplying module and a robot manipulator employing the same.

BACKGROUND OF THE INVENTION

With increasing development of industries, various automatic machineries have been developed to replace manpower, increase production speed and reduce costs. Assembly of electronic product usually requires screws to fasten objects (i.e., workpieces) together. Therefore, the screw tightening robot is widely used in production line assembly. Generally, the screw is supplied by the screw supplying module and tightened by the screw tightening module, thereby automating the screw supply and tighten-up process, thereby improving production efficiency and reducing labor costs.

Generally, the screw tightening robot utilizes a blowing-type screw supplying module, which includes a main body and a collet. The collet fixes the screw, and the screwdriver presses downward to tighten the screw. However, the structure of the conventional blowing-type screw supplying module is complicated, and the process of the collet clamping and fixing the screw may easily cause wear and increase the cost.

Therefore, there is a need of providing a screw supplying module and a robot manipulator employing the same to obviate the drawbacks encountered from the prior arts.

SUMMARY OF THE INVENTION

It is an object of the present disclosure to provide a screw supplying module and a robot manipulator employing the same. The combination of the elastic piece and the clamping piece are utilized to clamp the screw among the clamping pieces. Due to the elasticity of the elastic piece, the damage to the screw can be effectively reduced. Further, the utilized components are less, which can effectively reduce the cost and the space occupied. In addition, without changing the original structure and circuit of the robot manipulator, the screw supplying module and the automatic screw tightening module can be detachably coupled to the distal end of the articulated arm easily or can be additionally mounted to the articulated arm for automatically tightening the screw.

In accordance with one aspect of the present disclosure, a screw supplying module is provided and includes a main body, a feeding body and a holding module. The main body includes a first portion, a second portion, a third portion and a hollow part. The feeding body includes a feeding portion, a connecting portion and a feeding channel. The connecting portion is assembled to the third portion, the feeding channel and the hollow part are in communication with each other. The holding module includes a screw chamber, a plurality of clamping pieces, an elastic piece and a fixing piece. The screw chamber includes an input portion, an output portion, an outer ring wall and an inner space, the input portion is assembled to the second portion, the inner space is in communication with the hollow part. The outer ring wall has a plurality of holes, and the plurality of holes are in communication with the inner space respectively. The plurality of clamping pieces are inserted into the plurality of holes respectively. The plurality of clamping pieces are partially located in the inner space and are partially exposed from the holes of the screw chamber. The elastic piece is sleeved on the outer ring wall, and the elastic piece abuts against the part of the plurality of clamping pieces exposed from the holes. The fixing piece is sleeved on the outer ring wall and is configured to fix the elastic piece, and the elastic piece is located between the clamping pieces and the fixing piece. First, a screw is fed into the opening of the feeding portion. Then, by an external force, the screw is moved to the inner space via the feeding channel and the hollow part. Finally, the screw is clamped in the inner space by the plurality of clamping pieces.

In accordance with the other aspect of the present disclosure, a robot manipulator is provided and includes an articulated arm, a screw supplying module, an automatic screw tightening module and a connecting element. The articulated arm includes a connecting device. The automatic screw tightening module is detachably coupled to the connecting device of the articulated arm, and includes a plate assembly, an input module, a screwdriver module, a transmission module, a movable module, an elastic element and a position sensor. The plate assembly includes a base plate. The input module includes an input terminal. The screwdriver module includes a screwdriver and a screwdriver sleeve, and the screwdriver is securely coupled with the screwdriver sleeve. The transmission module is connected with the input terminal and the screwdriver sleeve for allowing the input terminal, the transmission module and the screwdriver sleeve to be rotated synchronously. The movable module is movably disposed on the base plate. The movable module includes a bearing, the screwdriver sleeve is partially accommodated in the bearing, and the screwdriver module and the movable module are coupled with each other and allowed to move relative to the base plate. The elastic element is disposed on the base plate and connected with the movable module. The position sensor is disposed on the base plate for sensing a displacement of the movable module. The screw supplying module is detachably coupled to the connecting device of the articulated arm, and includes a main body, a feeding body and a holding module. The main body includes a first portion, a second portion, a third portion and a hollow part. The feeding body includes a feeding portion, a connecting portion and a feeding channel. The connecting portion is assembled to the third portion, the feeding channel and the hollow part are in communication with each other. The holding module includes a screw chamber, a plurality of clamping pieces, an elastic piece and a fixing piece. The screw chamber includes an input portion, an output portion, an outer ring wall and an inner space, the input portion is assembled to the second portion, the inner space is in communication with the hollow part. The outer ring wall has a plurality of holes, and the plurality of holes are in communication with the inner space respectively. The plurality of clamping pieces are inserted into the plurality of holes, accordingly, the plurality of clamping pieces are partially located in the inner space and are partially exposed from the holes of the screw chamber. The elastic piece is sleeved on the outer ring wall, and the elastic piece abuts against the part of the plurality of clamping pieces exposed from the holes. The fixing piece is sleeved on the outer ring wall and is configured to fix the elastic piece, and the elastic piece is located between the clamping pieces and the fixing piece. The connecting device includes a connecting element, one end of the connecting element is connected with the screwdriver sleeve of the automatic screw tightening module, and the other end of the connecting element is connected with the first portion of the main body of the screw supplying module, the connecting element includes a hollow passage in communication with the hollow part of the main body, and the hollow passage is configured for the screwdriver to insert therein. First, a screw is fed into the opening of the feeding portion. Then, by an external force, the screw is moved to the inner space via the feeding channel and the hollow part. Finally, the screw is clamped in the inner space by the plurality of clamping pieces. The screwdriver penetrates through the hollow passage and the hollow part to contact the screw in the inner space, and the screw is tightened by the screwdriver.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
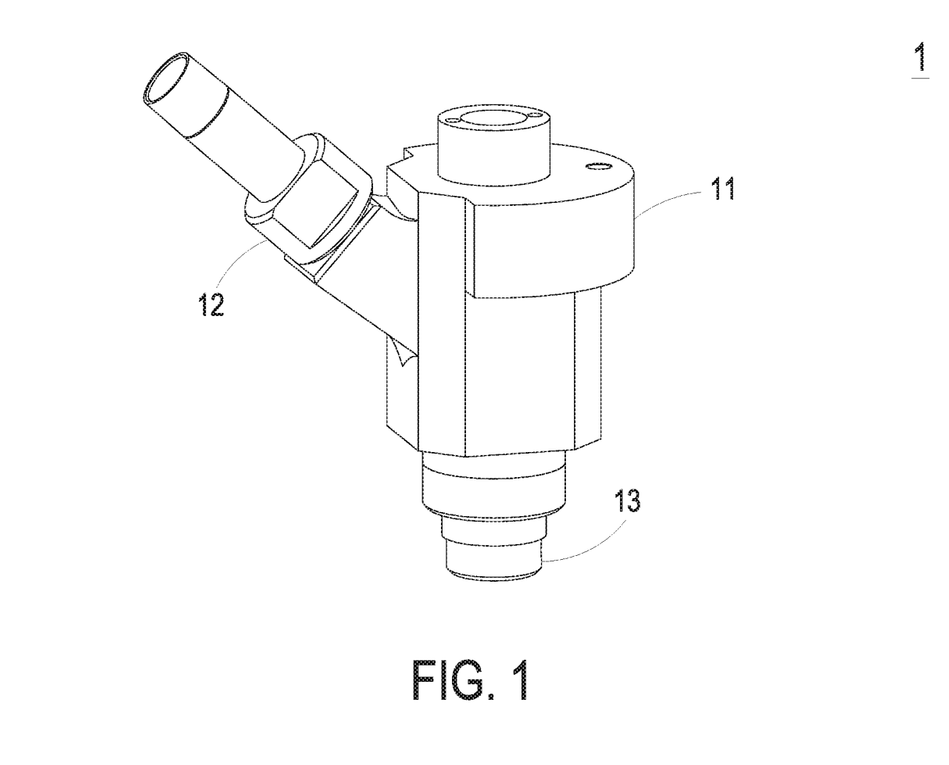
FIG. 1 is a schematic perspective view illustrating a screw supplying module according to an embodiment of the present disclosure.
Figure 2A:
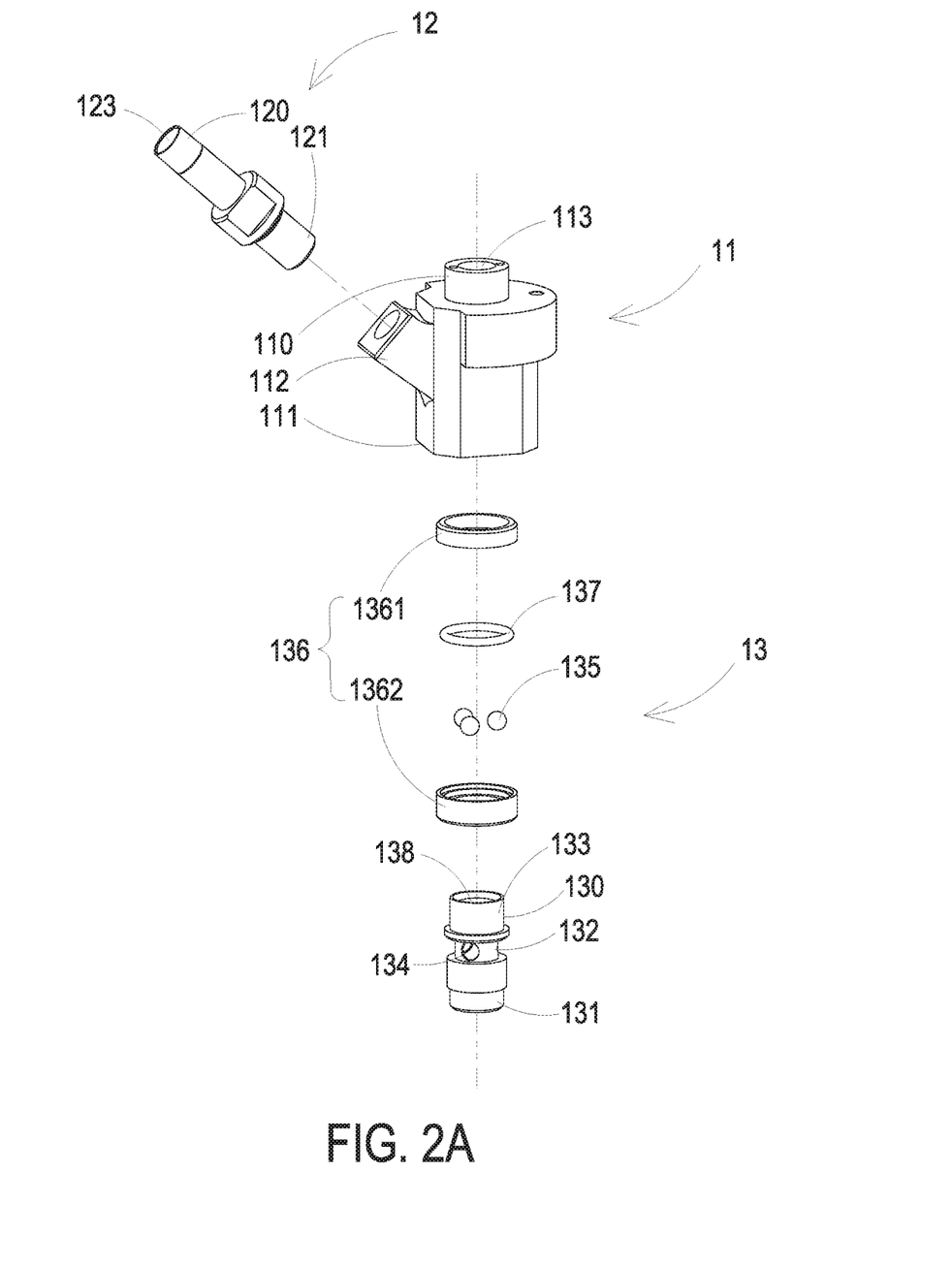
FIG. 2A is an exploded view illustrating the screw supplying module of FIG. 1.
Figure 2B:
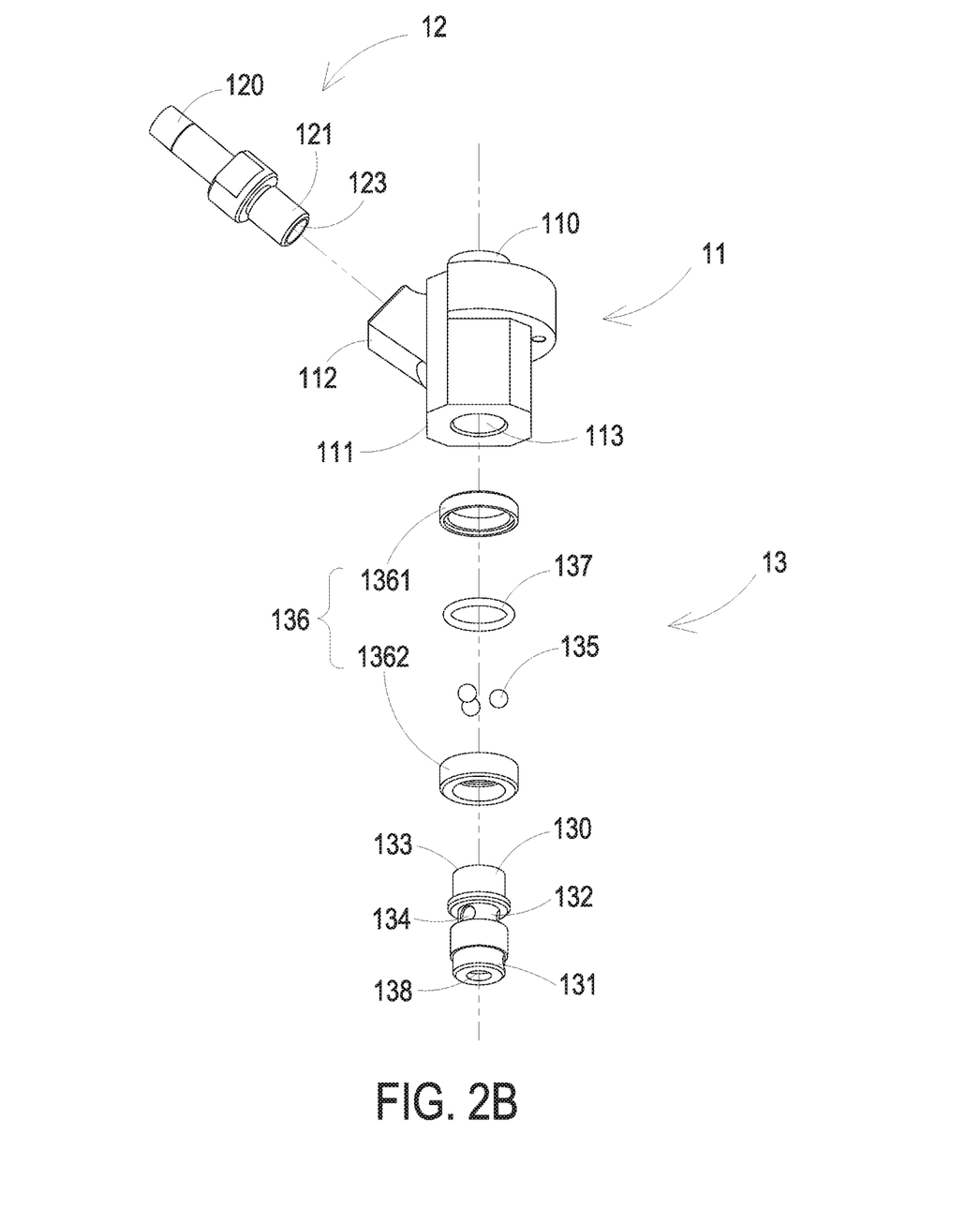
FIG. 2B is an exploded view illustrating the screw supplying module of FIG. 1 and taken along another viewpoint.
Figure 3:
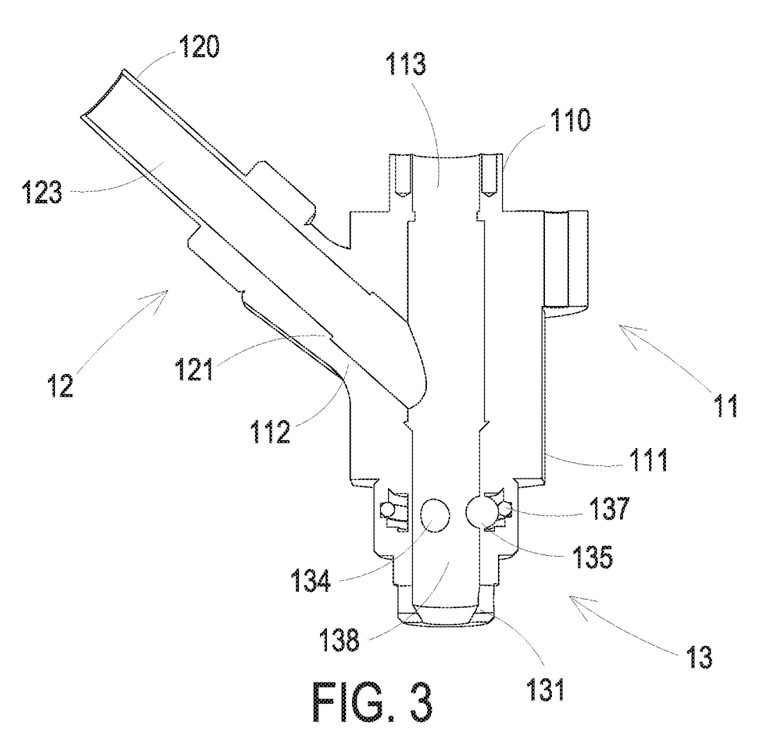
FIG. 3 is a schematic cross-sectional view illustrating the screw supplying module of FIG. 1.

FIG. 1 is a schematic perspective view illustrating a screw supplying module according to an embodiment of the present disclosure. FIG. 2A and FIG. 2B are exploded views illustrating the screw supplying module of FIG. 1 and taken along different viewpoints. FIG. 3 is a schematic cross-sectional view illustrating the screw supplying module of FIG. 1. As shown in FIGS. 1, 2A, 2B, and 3, the screw supplying module 1 is configured to supply screws. The screw supplying module 1 includes a main body 11, a feeding body 12 and a holding module 13. The main body 11 includes a first portion 110, a second portion 111, a third portion 112 and a hollow part 113. Each of the first portion 110, the second portion 111 and the third portion 112 has an opening communicated with the hollow part 113. The feeding body 12 includes a feeding portion 120, a connecting portion 121 and a feeding channel 123. Two ends of the feeding channel 123 are in communication with the opening of the feeding portion 120 and the opening of the connecting portion 121 respectively. The connecting portion 121 is assembled to the third portion 112 of the main body 11 so that the feeding channel 123 and the hollow part 113 of the main body 11 are in communication with each other.

The holding module 13 includes a screw chamber 130, a plurality of clamping pieces 135, an elastic piece 137 and a fixing piece 136. The screw chamber 130 includes an input portion 133, an output portion 131, an outer ring wall 132 and an inner space 138. The input portion 133 is assembled to the second portion 111 of the main body 11 so that the inner space 138 is in communication with the hollow part 113 of the main body 11. The outer ring wall 132 has a plurality of holes 134, and the plurality of holes 134 are in communication with the inner space 138 respectively. The plurality of clamping pieces 135 are inserted into and engaged in the plurality of holes 134 respectively. Accordingly, the plurality of clamping pieces 135 are partially located in the inner space 138 and are partially exposed from the holes 134 of the screw chamber 130. The elastic piece 137 is sleeved on the outer ring wall 132 of the screw chamber 130, and the elastic piece 137 abuts against the part of the plurality of clamping pieces 135 exposed from the holes 134. The fixing piece 136 is sleeved on the outer ring wall 132 and is configured to fix the elastic piece 137. The elastic piece 137 is located between the clamping pieces 135 and the fixing piece 136.

The process of the screw supplying module 1 supplying screws is exemplified as follows. First, a screw is fed into the opening of the feeding portion 120 of the feeding body 12. Then, by an external force, the screw is moved to the hollow part 113 of the main body 11 via the feeding channel 123 of the feeding body 12. Finally, the screw is moved into the inner space 138 of the screw chamber 130 and is clamped in the inner space 138 by the plurality of clamping pieces 135. Preferably but not exclusively, the external force applied to the screw is an inertial force of the screw being fed into the feeding body 12, gravity, or an additionally applied gas pressure. When the screw is moved into the inner space 138, the plurality of clamping pieces 135 engaged in the holes 134 are pushed by the screws to move toward the outside of the screw chamber 130. Further, the elastic piece 137 abutted against the plurality of clamping pieces 135 is pushed and deformed until the pushing force is balanced with the elastic recovery force of the elastic piece 137. Consequently, the screw can be engaged and clamped in the inner space 138 of the screw chamber 130 without falling downward. In addition, the fixing piece 136 sleeved on the outer ring wall 132 can limit the maximum deformation amount of the elastic piece 137. In an embodiment, the elastic piece 137 is an annular elastomer and is preferably but not limited to an O-ring.

It can be seen that the clamping piece 135 is inserted into and engaged in the corresponding hole 134 instead of completely falling into the inner space 138 when there is no screw in the inner space 138. Meanwhile, the position of the clamping piece 135 is limited by the elastic piece 137 and the fixing piece 136 so that the clamping piece 135 is prevented from completely falling out of the screw chamber 130. When the screw is moved in to the inner space 138, the position of the clamping piece 135 is changed because of the deformation of the elastic piece 137, thereby clamping the screw in the inner space 138. In the present disclosure, the relationship between the diameter of the clamping piece 135 and the corresponding hole 134, the specific elastic coefficient of the elastic piece 137 and the deformation range of the elastic piece 137 are able to implement the above process of supplying screw and are not limited specifically. For examples, every portion of the clamping pieces 135 has different diameter, some portions are smaller in diameter than the hole 134, and the other portions are larger in diameter than the hole 134, but not limited thereto.

In an embodiment, the fixing piece 136 includes a first fixing ring 1361 and a second fixing ring 1362. The first fixing ring 1361 and the second fixing ring 1362 are assembled to each other and are sleeved on the outer ring wall 132 of the screw chamber 130. The first fixing ring 1361 and the second fixing ring 1362 are securely sleeved on the elastic piece 137 on the outer ring wall 132. Each of the first fixing ring 1361 and the second fixing ring 1362 has an annular recess on the inner wall thereof. When the first fixing ring 1361 and the second fixing ring 1362 are assembled together, the annular recesses of the first fixing ring 1361 and the second fixing ring 1362 are connected to each other and form a space for accommodating the elastic piece 137.

Figure 4:
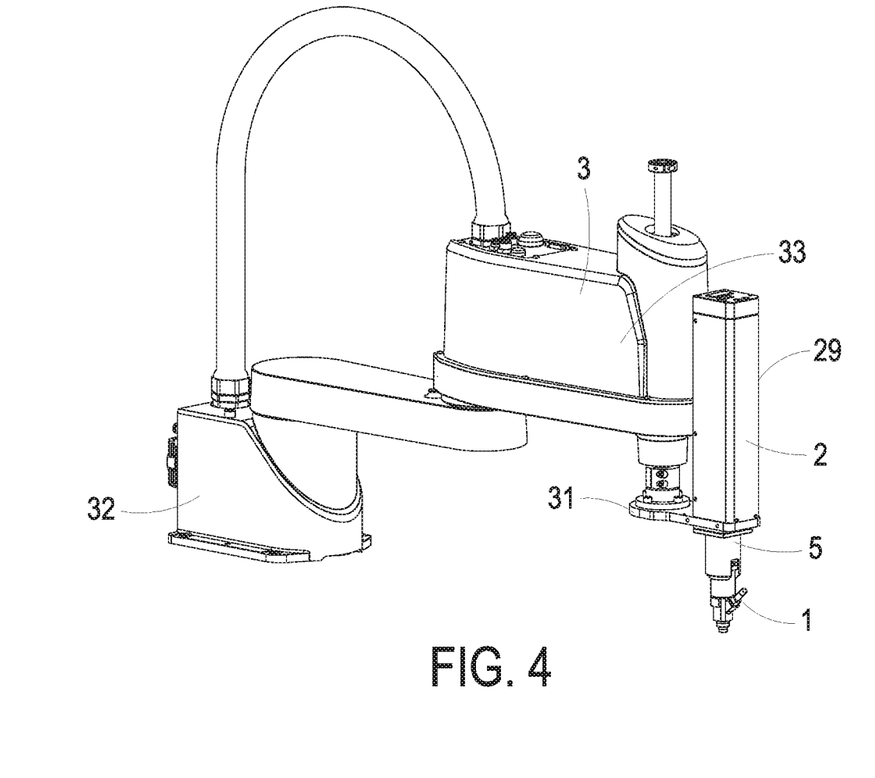
FIG. 4 is a schematic perspective view illustrating a selective compliance assembly robot arm according to an embodiment of the present disclosure.

FIG. 4 is a schematic perspective view illustrating a selective compliance assembly robot arm according to an embodiment of the present disclosure. As shown in FIG. 4, the SCARA robot 4 (i.e. Selective Compliance Assembly Robot Arm or robot manipulator) includes a screw supplying module 1, an automatic screw tightening module 2 and an articulated arm 3. The screw supplying module 1 and the automatic screw tightening module 2 can be detachably coupled to the distal end of the articulated arm 3 easily without changing the original structure and circuit of the articulated arm 3. The articulated arm 3 includes a connecting device 31, a base 32 and a multi-axis mechanism 33. The automatic screw tightening module 2 and the screw supplying module 1 are coupled to two ends of the connecting device 31. Preferably but not exclusively, the SCARA robot 4 is a four-axis robot manipulator. The articulated arm 3 can move the screw supplying module 1 and the automatic screw tightening module 2 toward the object according to the control of the control unit of the SCARA robot 4. By using the SCARA robot 4, the screw tightening positions of the objects can be acquired accurately, and tightening the screws provided by the screw supplying module 1, and the forces applied on the objects can be well controlled for avoiding the damages of the objects. In addition, the screw supplying module 1 and the automatic screw tightening module 2 can be detachably coupled to the distal end of the articulated arm 3 easily without changing the original structure and circuit of the SCARA robot 4.

Figure 5:
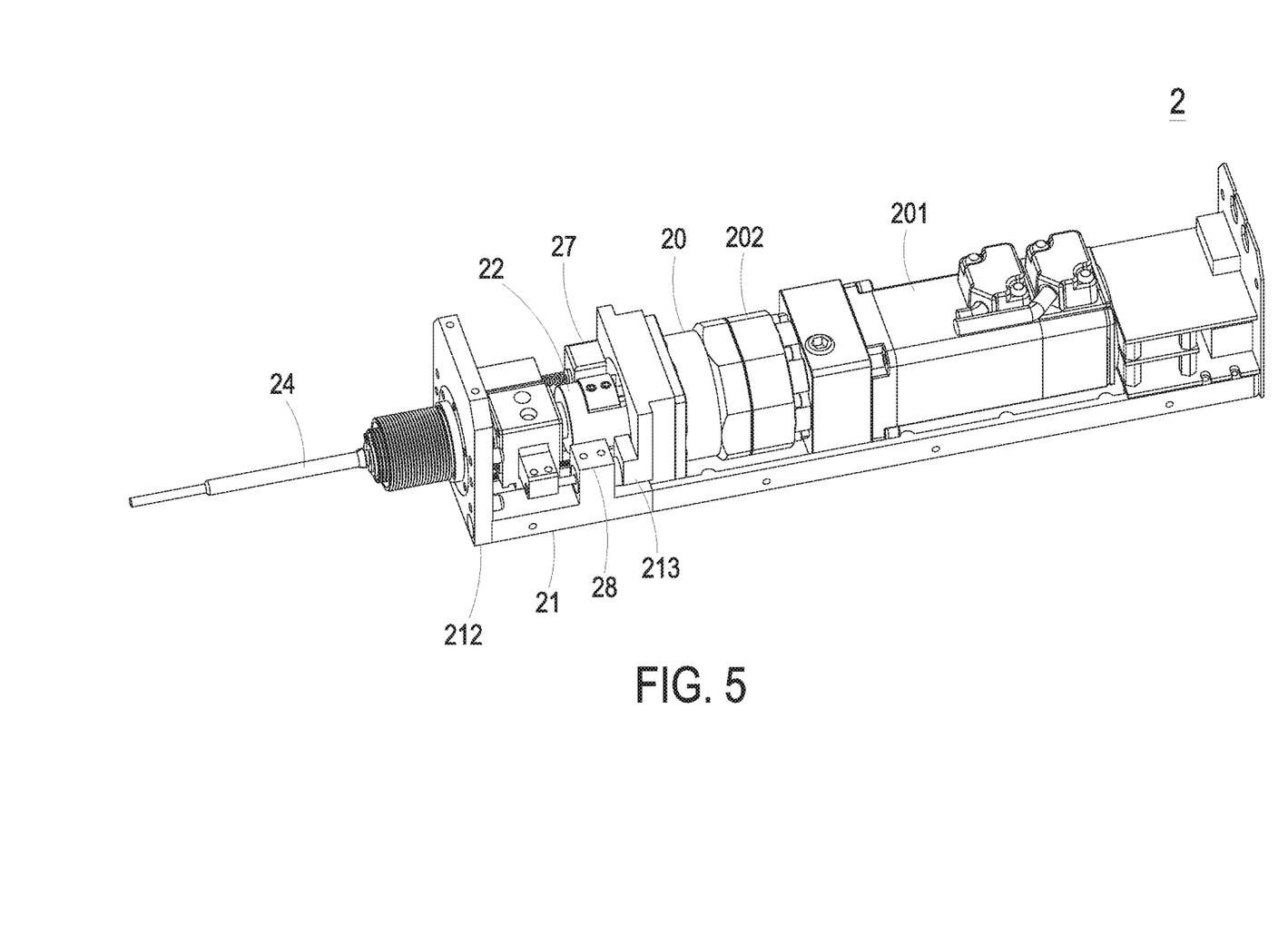
FIG. 5 is a schematic perspective view illustrating a part of the automatic screw tightening module of FIG. 4.
Figure 6:
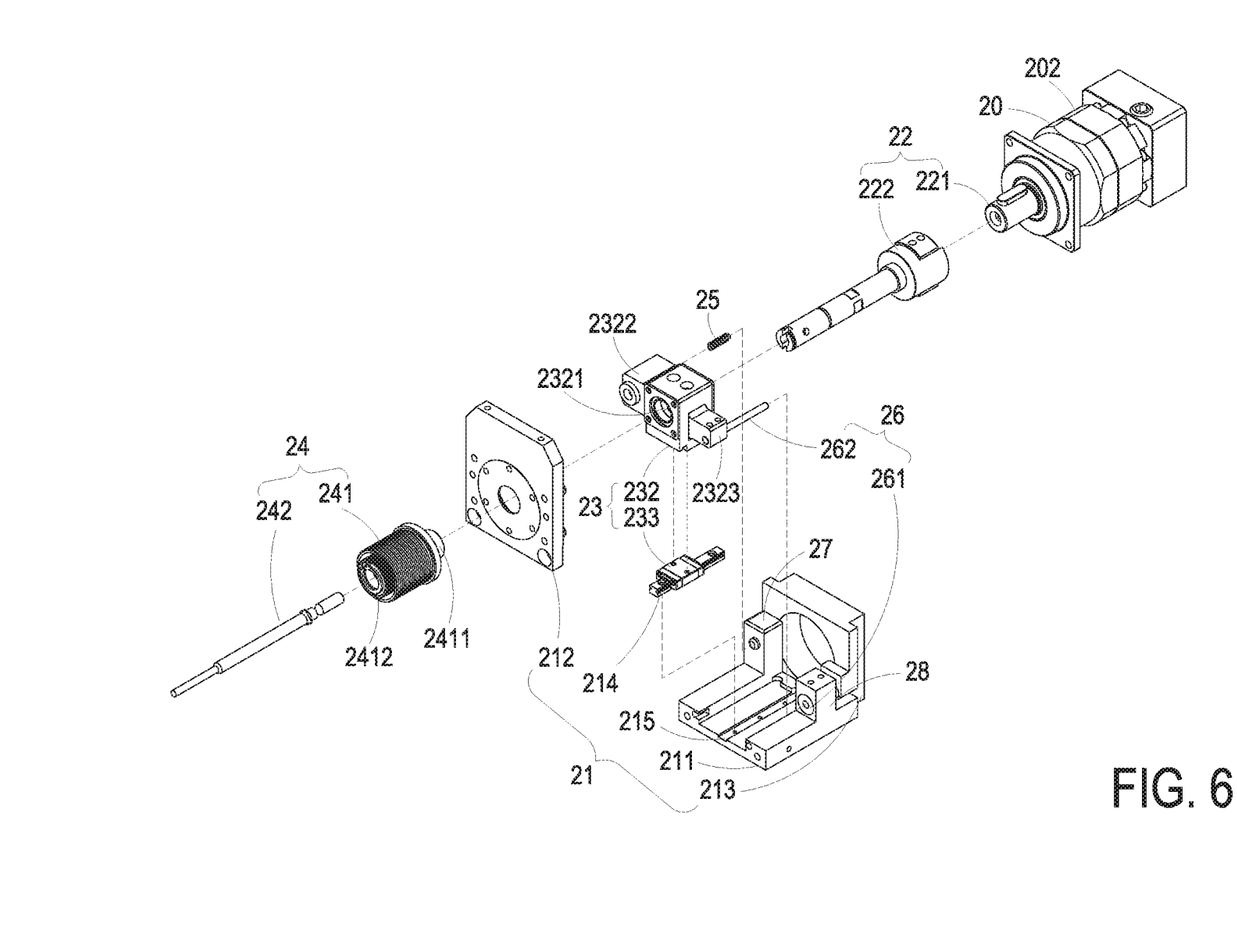
FIG. 6 is an exploded view illustrating a part of the automatic screw tightening module of FIG. 5.

FIG. 5 is a schematic perspective view illustrating a part of the automatic screw tightening module of FIG. 4. FIG. 6 is an exploded view illustrating a part of the automatic screw tightening module of FIG. 5. As shown in FIGS. 5 and 6, the automatic screw tightening module 2 includes a cover 29, an input module 20, a plate assembly 21, a transmission module 22, a movable module 23, a screwdriver module 24, an elastic element 25, a position sensor 26, a first fixing bracket 27, a second fixing bracket 28, a motor 201 and a deceleration machine 202. The cover 29 is configured to shadow the components of the automatic screw tightening module 2. The plate assembly 21 includes a base plate 211, a first side support plate 212, and a second side support plate 213. The first side support plate 212 and the second side support plate 213 are securely mounted on two side edges of the base plate 211. The base plate 211, the first side support plate 212 and the second side support plate 213 define an accommodation space for mounting at least the transmission module 22, the movable module 23, the elastic element 25, the position sensor 26, the first fixing bracket 27 and the second fixing bracket 28 therein. The first fixing bracket 27 and the second fixing bracket 28 are disposed on the base plate 211. The first side support plate 212 is configured to install the screwdriver module 24, and the second side support plate 213 is configured to support the input module 20. The base plate 211 has a recess 215 disposed on the inner surface thereof. In this embodiment, the plate assembly 21 further includes a rail 214 mounted on the inner surface of the base plate 211. Preferably, the rail 214 is securely mounted on the bottom surface of the recess 215.

The input module 20 includes an input terminal. The transmission module 22 includes a driving shaft 221 and a transmission shaft 222. A part of the driving shaft 221 is accommodated in and securely connected to the input terminal. Consequently, when the input terminal is rotated by the driving of the motor 201 and the deceleration machine 202, the driving shaft 221 and transmission shaft 222 are rotated synchronously.

The movable module 23 includes a connection bracket 232 and a sliding carrier 233. The connection bracket 232 is securely mounted on the surface of the sliding carrier 233, and the connection bracket 232 and the sliding carrier 233 can be moved together along the rail 214. The connection bracket 232 includes a bearing 2321, a first extension portion 2322 and a second extension portion 2323. The first extension portion 2322 and the second extension portion 2323 are arranged at two opposite sides of the bearing 2321. The sliding carrier 233 is movably coupled with the rail 214 on the base plate 211, so that the sliding carrier 233 together with the connection bracket 232 can be moved along the rail 214. The transmission shaft 222 is accommodated in the bearing 2321 of the connection bracket 232. The screwdriver module 24 includes a screwdriver sleeve 241 and a screwdriver 242. The screwdriver sleeve 241 includes a first coupling part 2411 and a second coupling part 2412. The first coupling part 2411 is accommodated in the bearing 2321 of the connection bracket 232 so that the movable module 23 coupled to the screwdriver module 24 can be movable relative to the base plate 211. In addition, one end of the transmission shaft 222 is connected to the driving shaft 221, and the other end of the transmission shaft 222 is securely coupled with the first coupling part 2411 of the screwdriver sleeve 241. Accordingly, the screwdriver 242, the screwdriver sleeve 241, the transmission shaft 222 and the driving shaft 221 are allowed to rotate synchronously.

One end of the elastic element 25 is connected with the first extension portion 2322 of the connection bracket 232, and the other end of the elastic element 25 is connected with the first fixing bracket 27. The first fixing bracket 27 is securely mounted on the inner surface of the base plate 211. When the connection bracket 232 together with the sliding carrier 233 are moved along the rail 214, the connection bracket 232 exerts a force upon the elastic element 25. Consequently, the elastic element 25 is compressed, and an elastic restoring force is induced on the elastic element 25 for allowing the connection bracket 232 to be returned to the original position. The elastic element 25 has a specific coefficient of elasticity (i.e. Young's modulus). Preferably but not exclusively, the elastic element 25 is a spring.

The position sensor 26 includes a first sensing element 261 (i.e., fixing part) and a second sensing element 262 (i.e., moving part). The first sensing element 261 is securely mounted on the second fixing bracket 28. The second fixing bracket 28 is securely mounted on the inner surface of the base plate 211. The second sensing element 262 is securely mounted on the second extension portion 2323 of the connection bracket 232, and the second sensing element 262 is movably accommodated in the first sensing element 261. Consequently, the position sensor 26 can be employed to sensing the displacement of the connection bracket 232 according to the movement of the second sensing element 262 relative to the first sensing element 261. It is noted that the structure of the position sensor 26 is not limited to the above-mentioned embodiment, various position sensor 26 (for example an optical position sensor) can be employed for sensing the displacement of the connection bracket 232 according to practical requirements.

Please refer to FIGS. 1, 4, 5 and 6. The connecting device 31 includes a connecting element 5. One end of the connecting element 5 is connected with the screwdriver sleeve 241 of the automatic screw tightening module 2, and the other end of the connecting element 5 is connected with the first portion 110 of the main body 11 of the screw supplying module 1. The connecting element 5 includes a hollow passage in communication with the hollow part 113 of the main body 11, and the hollow passage is configured for the screwdriver 242 to insert therein. When the screw is fed into the screw supplying module 1 and clamped in the inner space 138, the screwdriver 242 of the automatic screw tightening module 2 penetrates through the hollow passage of the connecting element 5 and the hollow part 113 of the screw supplying module 1. A part of the screwdriver 242 is located in the inner space 138 and is contacted with the screw. The screwdriver 242 abuts against the screw in the inner space 138, and the screwdriver 242 and the screw move toward the object to be tightened synchronously. Then, the input terminal of the automatic screw tightening module 2 is driven to rotate by the motor 201, thereby driving the driving shaft 221, the transmission shaft 222 and the screwdriver sleeve 241 to rotate synchronously. Consequently, the screwdriver 242 is rotated to perform screw operations. In addition, when the screw contacts with the object, the screwdriver 242 bears a pressure thereon. Under this circumstance, the screwdriver module 24 pushes the connection bracket 232 of the movable module 23 to move. Accordingly, the connection bracket 232 and the sliding carrier 233 are moved along the rail 214 on the base plate 211, and the connection bracket 232 exerts a force on the elastic element 25. Consequently, the elastic element 25 is compressed. Meanwhile, the second sensing element 262 securely mounted on the second extension portion 2323 of the connection bracket 232 is moved relative to the first sensing element 261. Consequently, the displacement of the connection bracket 232 is acquired. Since the acquired displacement of the connection bracket 232 is equal to the deformation of the elastic element 25, the deformation of the elastic element 25 can be acquired. According to the Hooke's law, the force applied on the screwdriver 242 can be acquired according to the elasticity coefficient of the elastic element 25 and the displacement amount obtained by the position sensor 26. When the automatic screw tightening module 2 determines that the level of applied force is over a preset level, the screw operation of the automatic screw tightening module 2 is stopped for preventing the damage of the objects.

From the above descriptions, the present disclosure provides a screw supplying module and a robot manipulator employing the same. The combination of the elastic piece and the clamping piece are utilized to clamp the screw among the clamping pieces. Due to the elasticity of the elastic piece, the damage to the screw can be effectively reduced. Further, the utilized components are less, which can effectively reduce the cost and the space occupied. In addition, without changing the original structure and circuit of the robot manipulator, the screw supplying module and the automatic screw tightening module can be detachably coupled to the distal end of the articulated arm easily or can be additionally mounted to the articulated arm for automatically tightening the screw. Furthermore, the robot arm of the present disclosure can well control the force applied on the object so as to prevent damage to the object.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A screw supplying module, comprising:
   a main body comprising a first portion, a second portion, a third portion and a hollow part;
   a feeding body comprising a feeding portion, a connecting portion and a feeding channel, wherein the connecting portion is assembled to the third portion, and the feeding channel and the hollow part are in communication with each other; and
   a holding module, comprising:
      a screw chamber comprising an input portion, an output portion, an outer ring wall and an inner space, wherein the input portion is assembled to the second portion, the inner space is in communication with the hollow part, the outer ring wall has a plurality of holes, and the plurality of holes are in communication with the inner space respectively;
      a plurality of clamping pieces inserted into the plurality of holes respectively, wherein the plurality of clamping pieces are partially located in the inner space and are partially exposed from the holes of the screw chamber;
      an elastic piece sleeved on the outer ring wall, wherein the elastic piece abuts against parts of the plurality of clamping pieces exposed from the holes; and
      a fixing piece sleeved on the outer ring wall and configured to fix the elastic piece, wherein the elastic piece is located between the clamping pieces and the fixing piece,
   wherein a screw is fed into the feeding portion, the screw is moved to the inner space via the feeding channel and the hollow part by an external force, and the screw is clamped in the inner space by the plurality of clamping pieces.

2. The screw supplying module according to claim 1, wherein the plurality of clamping pieces are engaged in the corresponding plurality of holes on the outer ring wall, when the screw is moved into the inner space, the plurality of clamping pieces are pushed by a pushing force from the screw, the plurality of clamping pieces and the elastic piece are moved toward an outside of the screw chamber until the pushing force is balanced with an elastic recovery force of the elastic piece, and the screw is clamped in the inner space by the plurality of clamping pieces.

3. The screw supplying module according to claim 1, wherein the elastic piece is an annular elastomer.

4. The screw supplying module according to claim 1, wherein the fixing piece comprises a first fixing ring and a second fixing ring, and the first fixing ring and the second fixing ring are assembled to each other and are sleeved on the outer ring wall to fix the elastic piece.

5. The screw supplying module according to claim 4, wherein each of the first fixing ring and the second fixing ring has an annular recess on an inner wall thereof, and when the first fixing ring and the second fixing ring are assembled together, the annular recesses of the first fixing ring and the second fixing ring are connected to each other and form a space for accommodating the elastic piece.

6. A robot manipulator, comprising:
an articulated arm comprising a connecting device;
an automatic screw tightening module detachably coupled to the connecting device of the articulated arm, comprising:
 a plate assembly comprising a base plate;
 an input module comprising an input terminal;
 a screwdriver module comprising a screwdriver and a screwdriver sleeve, wherein the screwdriver is coupled with the screwdriver sleeve;
 a transmission module connected with the input terminal and the screwdriver sleeve for allowing the input terminal, the transmission module and the screwdriver sleeve to be rotated synchronously;
 a movable module movably disposed on the base plate, wherein the movable module comprises a bearing, the screwdriver sleeve is partially accommodated in the bearing, and the screwdriver module and the movable module are coupled with each other and are allowed to move relative to the base plate;
 an elastic element disposed on the base plate and connected with the movable module; and
 a position sensor disposed on the base plate for sensing a displacement of the movable module; and
a screw supplying module detachably coupled to the connecting device of the articulated arm, comprising:
 a main body comprising a first portion, a second portion, a third portion and a hollow part;
 a feeding body comprising a feeding portion, a connecting portion and a feeding channel, wherein the connecting portion is assembled to the third portion, and the feeding channel and the hollow part are in communication with each other; and
 a holding module, comprising:
  a screw chamber comprising an input portion, an output portion, an outer ring wall and an inner space, wherein the input portion is assembled to the second portion, the inner space is in communication with the hollow part, the outer ring wall has a plurality of holes, and the plurality of holes are in communication with the inner space respectively;
  a plurality of clamping pieces inserted into the plurality of holes respectively, wherein the plurality of clamping pieces are partially located in the inner space and are partially exposed from the holes of the screw chamber;
  an elastic piece sleeved on the outer ring wall, wherein the elastic piece abuts against parts of the plurality of clamping pieces exposed from the holes; and
  a fixing piece sleeved on the outer ring wall and configured to fix the elastic piece, wherein the elastic piece is located between the clamping pieces and the fixing piece,
wherein the connecting device comprises a connecting element, one end of the connecting element is connected with the screwdriver sleeve of the automatic screw tightening module, the other end of the connecting element is connected with the first portion of the main body of the screw supplying module, the connecting element comprises a hollow passage in communication with the hollow part of the main body, and the hollow passage is configured for the screwdriver to insert therein;
wherein a screw is fed into the feeding portion, the screw is moved to the inner space via the feeding channel and the hollow part by an external force, and the screw is clamped in the inner space by the plurality of clamping pieces, the screwdriver penetrates through the hollow passage and the hollow part to contact the screw in the inner space, and the screw is tightened by the screwdriver.

7. The robot manipulator according to claim 6, wherein the plurality of clamping pieces are engaged in the corresponding plurality of holes on the outer ring wall, when the screw is moved into the inner space, the plurality of clamping pieces are pushed by a pushing force from the screw, the plurality of clamping pieces and the elastic piece are moved toward an outside of the screw chamber until the pushing force is balanced with an elastic recovery force of the elastic piece, and the screw is clamped in the inner space by the plurality of clamping pieces.

8. The robot manipulator according to claim 6, wherein the elastic piece is an annular elastomer.

9. The robot manipulator according to claim 6, wherein the fixing piece comprises a first fixing ring and a second fixing ring, and the first fixing ring and the second fixing ring are assembled to each other and are sleeved on the outer ring wall to fix the elastic piece.

10. The robot manipulator according to claim 9, wherein each of the first fixing ring and the second fixing ring has an annular recess on an inner wall thereof, and when the first fixing ring and the second fixing ring are assembled together, the annular recesses of the first fixing ring and the second fixing ring are connected to each other and form a space for accommodating the elastic piece.

11. The robot manipulator according to claim 6, wherein according to the displacement and an elasticity coefficient of the elastic element, the automatic screw tightening module acquires a force exerted by the screwdriver when the screwdriver performs screw tightening on an object.

12. The robot manipulator according to claim 6, wherein the plate assembly comprises a rail, an inner surface of the base plate has a recess, and the rail is mounted on a bottom surface of the recess.

13. The robot manipulator according to claim 12, wherein the plate assembly comprises:
a first side support plate mounted on a side edge of the base plate for supporting the screwdriver module; and
a second side support plate mounted on the other side edge of the base plate for supporting the input module,
wherein the base plate, the first side support plate and the second side support plate define an accommodation space, and the accommodation space is configured for accommodating the input module, the transmission module, the movable module, the elastic element and the position sensor.

14. The robot manipulator according to claim 12, wherein the movable module comprises:
a sliding carrier movably coupled with the rail; and
a connection bracket mounted on a surface of the sliding carrier and moved along the rail together with the sliding carrier, wherein the connection bracket comprises the bearing, a first extension portion and a second extension portion, and the first extension portion and the second extension portion are arranged at two opposite sides of the bearing.

15. The robot manipulator according to claim 14, further comprising a first fixing bracket mounted on the base plate, wherein one end of the elastic element is connected with the first fixing bracket, and the other end of the elastic element is connected with the first extension portion, and the connection bracket exerts a force upon the elastic element when the connection bracket and the sliding carrier are moved along the rail.

16. The robot manipulator according to claim 14, further comprising a second fixing bracket mounted on the base plate, wherein the position sensor comprises:
- a first sensing element mounted on the second fixing bracket; and
- a second sensing element mounted on the second extension portion and movably accommodated in the first sensing element.

* * * * *